March 19, 1968
A. M. GROVE
3,373,953
FISHING REEL CONSTRUCTION
Filed May 25, 1966
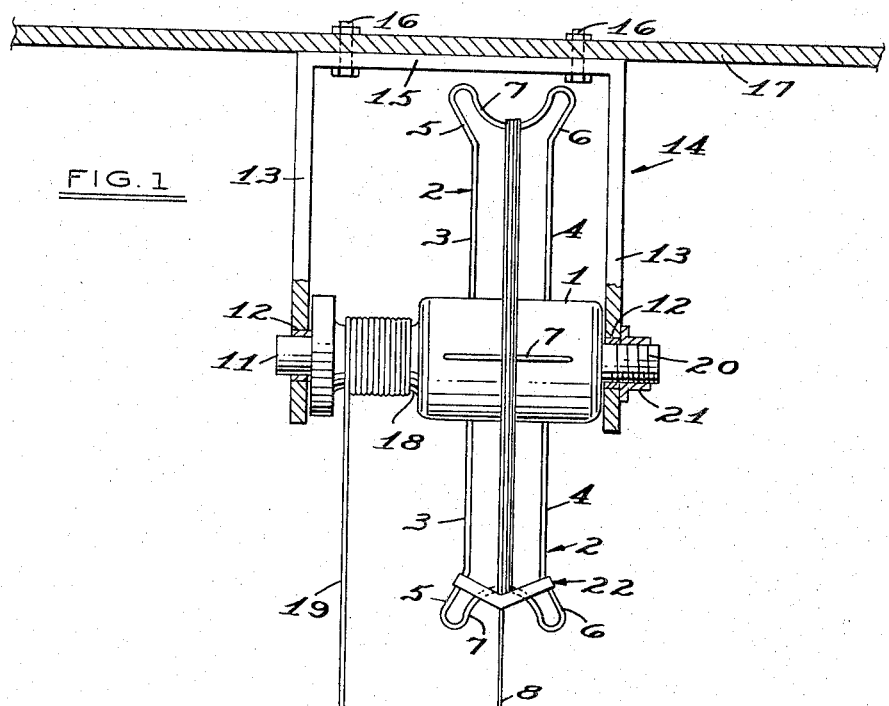
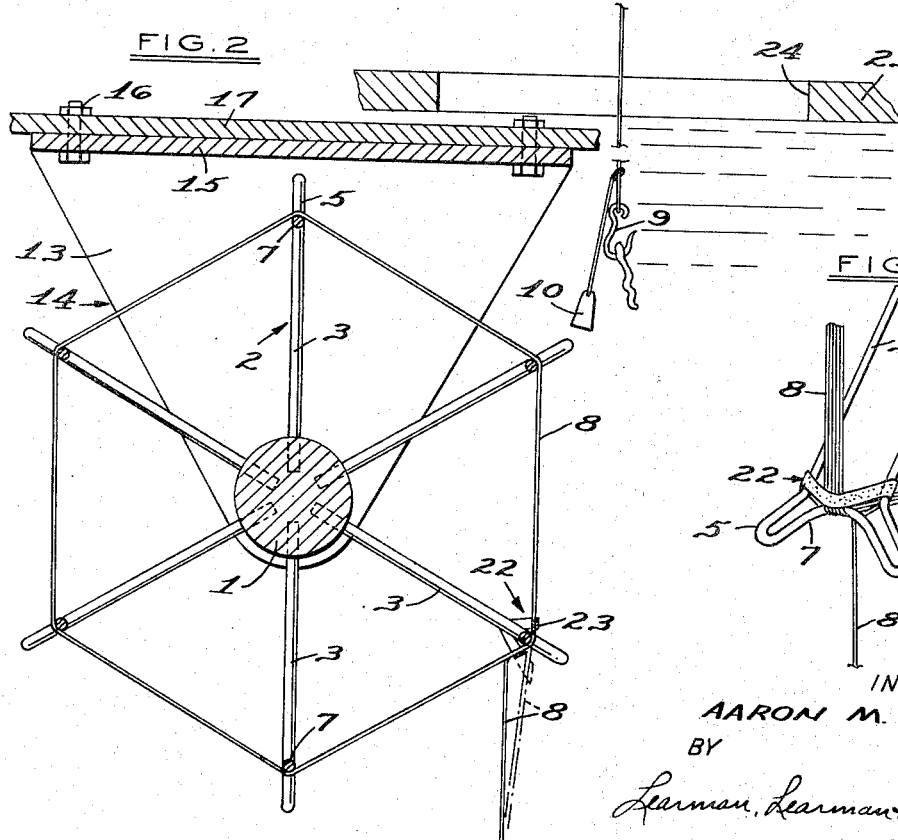
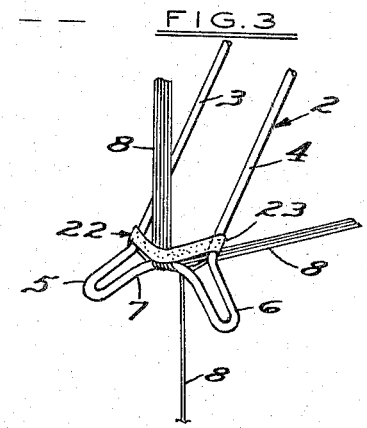
INVENTOR
AARON M. GROVE
BY
Learman, Learman & McCulloch
ATTORNEYS

United States Patent Office 3,373,953
Patented Mar. 19, 1968

3,373,953
FISHING REEL CONSTRUCTION
Aaron M. Grove, 526 N. Antler St.,
Gladwin, Mich. 48624
Filed May 25, 1966, Ser. No. 552,763
8 Claims. (Cl. 242—104)

ABSTRACT OF THE DISCLOSURE

A fishing reel having a rotatable drum from which extends a plurality of radial spokes having free ends about which a fishing line may be wound circumferentially of the drum and including an elastic band mounted on and surrounding one of the spokes at its free end so as to overlie a selected number of convolutions of the line.

---

This invention relates to fishing reels and more particularly to a fishing reel which is capable of suspending a hook at a predetermined depth below the surface of a lake or the like and which also is capable of absorbing the shock of a strike.

It is conventional practice when ice fishing to utilize a reel of some kind on which a fishing line is wound and to support the reel in a position above a hole formed in the ice so as to permit the hook to be suspended at a desired level below the surface of the water. It also is normal practice to leave the reel unattended and rely upon the fish to hook itself. Conventional reels have a line wound around a rotatable drum or wheel which must be locked against rotation when the hook is located at the desired level. With such reels it is not uncommon for the fishing line to be snapped when a fish strikes the bait. Other known reels have friction brake mechanisms which permit the activity of a fish to effect the unreeling of additional line following a strike, but such brake mechanisms are in capable of maintaining tension on the line except when the fish is moving away from the reel.

None of the known reels provides any means for winding a line so as to raise a hook from a desired level and permit the line subsequently to be unwound so as automatically to restore the hook to precisely the same level.

An object of this invention is to provide a fishing reel construction which overcomes the disadvantages of previously known reels.

Another object of the invention is to provide a fishing reel construction which is capable of absorbing shocks imposed on a line so as to minimize the risk of line breakage.

A further object of the invention is to provide a reel construction having means for conditioning a fishing line in such manner as to permit a hook at the free end of the line to be raised from and lowered repeatedly to the same level and which is capable automatically of supporting the hook at that level.

Another object of the invention is to provide a fishing reel of the character described which is inexpensive to manufacture, simple in operation, and rugged in use.

Other objects and advantages of the invention will be pointed out specifically or will become apparent from the following description when it is considered in conjunction with the appended claims and the accompanying drawing, in which:

FIGURE 1 is a fragmentary, partly elevational and partly sectional view illustrating a fishing reel constructed in accordance with the invention and supported in such manner as to suspend a hook at a predetermined level below a layer of ice;

FIGURE 2 is a vertical sectional view of the apparatus; and

FIGURE 3 is a fragmentary, perspective view of a detail.

Apparatus constructed in accordance with the disclosed embodiment of the invention comprises a generally cylindrical drum or hub member 1 to which is secured circumferentially spaced, radially extending spoke members 2, each of which is identical. Each spoke member preferably comprises a pair of generally parallel, wire arms 3 and 4 terminating at their radially outer ends in diverging sections 5 and 6, respectively, that are joined to one another by an outwardly concave web 7.

One end of a fishing line 8 may be secured to one of the webs 7, or to the drum 1, if desired, and the remainder of the line then may be wound in successive convolutions around the spokes with each convolution being accommodated by the arcuate web 7. To the free end of the line may be secured a hook 9 and a sinker 10.

Means is provided for mounting the reel for rotation about the axis of the drum 1 and comprises a shaft 11 the opposite ends of which may be journaled in bearings 12 that are supported in parallel arms 13 of a bracket 14 having a web 15 which may be secured by suitable means such as bolts 16 to any suitable support 17. The drum 1 preferably has a reduced diameter neck portion 18 to which is secured one end of a cord 19 which may be wound around the neck 18 for a purpose presently to be explained It also is preferred that one end of the shaft 11 be threaded as at 20 to accommodate a correspondingly threaded nut 21 which is adapted to bear against the adjacent bracket arm 13 and function as a friction brake to control the speed of rotation of the reel.

Apparatus constructed in accordance with the invention also includes a retaining means 22 which preferably comprises a flat, endless elastic band 23. The normal, unstressed length of the band 23 preferably is such that it corresponds substantially to the spacing between a pair of spoke arms 3 and 4 so as to be capable of snugly engaging the arms radially inwardly of the the portions 5 and 6 without any risk of inadvertent separation of the band from the spoke on which it is mounted.

To condition the apparatus for use, the retainer band 23 is removed from the spoke 2 and the reel is mounted in a position over a hole 24 formed in a laryer of ice 25 at the surface of a river or lake. The line 8 then may be withdrawn from the reel so as to locate the hook 9 at a desired level beneath the surface of the water. Withdrawal of the line is accompanied by rotation of the reel, and rotation of the reel will effect winding of the cord 19 around the drum neck 18.

When the hook 9 has been lowered to the desired level, the retainer band 23 may be mounted on one of the spokes 2 so as to overlie the remaining line convolutions wound on the reel. The underlying convolutions of the line will cause the band 23 to be stretched so that it bears snugly against the line convolutions on both sides of the associated web 7, as is best shown in FIGURE 2. That portion of the unwound length of line 8 which lies adjacent the retainer band 23 will be held by the band against the remaining convolutions of the line that remain on the reel, as is indicated in full lines in FIGURE 2.

The construction and arrangement of the parts are such that, when the retaining means 22 is assembled with the reel and line in the manner indicated in the drawing, further unwinding of the line 8 from the reel is precluded by the retainer band 23. However, the unwound portion of the line may be rewound on the reel by rotation of the latter, in which event the rewound line will be wound in successive convolutions which overlies the retainer band 23. Rewinding of the line may be effected quite simply by exerting a vertically downward force on the cord 19.

In the use of the apparatus, a desired length of line may be unwound from the reel so as to position the hook 9 at the desired level. The retainer band 23 then may be assembled with one of the spokes 22 so as to overlie the unwound line convolutions. When a fish strikes the hook, the resilient band 23 may stretch so as to absorb the shock of the strike and permit the unwound length of line to remove from the position shown in full lines in FIGURE 2 to the dotted line position. The stretching of the band 23, however, imposes tension on the unwound length of line and tends constantly to restore the latter to the position shown in full lines in FIGURE 2, thereby assisting in hooking the fish. To land the fish, the fisherman may pull on the cord 19 to effect rewinding of the line 8. The line being rewound will form successive convolutions which overlie the band 23.

When the fish is unhooked from the line, the hook may be rebaited and dropped through the opening 24. The reel may be rotated in a direction to lower the hook and to rewind the cord 19 on the drum neck 18. When the line 8 has been unwound from the reel to such an extent that no more convolutions overlie the band 23, no further line may be unwound. At this time the hook 9 will be located at exactly the same level that it was previously.

The disclosed embodiment is representative of a presently preferred form of the invention, but is intended to be illustrated rather than definitive thereof. The invention is defined in the claims.

1. A fishing reel construction comprising a drum member; a plurality of substantially radial spoke members having free radially outer ends extending from said drum member and around which a line may be wound circumferentially of said drum member; and elastic retainer means mounted on one of said members adjacent the outer end thereof, said retainer means being adapted to overlie a plurality of wound convolutions of said line and permit other successive convolutions of said line to overlie said retainer means.

2. The construction set forth in claim 1 wherein each of said spoke members at the radially outer end thereof has a pair of generally parallel, spaced apart arms between which the convolutions of said line may be received.

3. The construction set forth in claim 3 wherein said retainer means spans the space between said arms.

4. The construction set forth in claim 1 including means mounting said drum member for rotation.

5. The construction set forth in claim 4 including means connected to said drum member for rotating the latter.

6. A fishing reel construction comprising a drum member; a plurality of circumferentially spaced, radially extending spoke members secured to said drum member, each of said spoke members being free at its outer end; a fishing line secured at one of its ends to one of said members and being wound in successive convolutions around each of said spoke members circumferentially of said drum, the other end of said line being free; and elastic retainer means carried by and surrounding one of said spoke members adjacent the free end thereof, said retainer means overlying a selected number of the convolutions wound around said one of said spoke members.

7. The construction set forth in claim 6 wherein each of said spoke members at the radially outer end thereof has a pair of generally parallel, spaced apart arms between which the convolutions of said line may be received.

8. The construction set forth in claim 7 wherein said retainer means spans the space between said arms.

References Cited

UNITED STATES PATENTS

| | | | |
|---|---|---|---|
| 693,854 | 2/1902 | Gamble | 242—125.3 |
| 1,898,451 | 2/1933 | Kelly | 242—84.1 |
| 2,219,500 | 10/1940 | West | 242—77 |
| 2,282,147 | 5/1942 | Quentin et al. | 242—104 |
| 2,647,625 | 8/1953 | Mason et al. | 242—125.3 X |
| 3,176,929 | 4/1965 | Britt | 242—84.1 |

FRANK J. COHEN, *Primary Examiner.*

N. L. MINTZ, *Examiner.*